(12) United States Patent
Lexilus et al.

(10) Patent No.: US 12,509,994 B2
(45) Date of Patent: Dec. 30, 2025

(54) PROTECTION ELEMENT FOR A COMPRESSOR DRUM AND METHOD FOR REPAIRING A COMPRESSOR DRUM

(71) Applicant: Safran Aircraft Engines, Paris (FR)

(72) Inventors: Jean-Hilaire Lexilus, Moissy-Cramayel (FR); Thomas Jean Georges Seguin, Moissy-Cramayel (FR); Davy Clerc, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 19/102,058

(22) PCT Filed: Jul. 4, 2023

(86) PCT No.: PCT/EP2023/068326
§ 371 (c)(1),
(2) Date: Feb. 7, 2025

(87) PCT Pub. No.: WO2024/032977
PCT Pub. Date: Feb. 15, 2024

(65) Prior Publication Data
US 2025/0257664 A1    Aug. 14, 2025

(30) Foreign Application Priority Data
Aug. 11, 2022 (FR) .................................. 2208244

(51) Int. Cl.
*F01D 5/30* (2006.01)
(52) U.S. Cl.
CPC .......... *F01D 5/3092* (2013.01); *F01D 5/3038* (2013.01); *F05D 2230/54* (2013.01); *F05D 2260/98* (2013.01)
(58) Field of Classification Search
CPC ....... F01D 5/3023; F01D 5/303; F01D 5/3038
See application file for complete search history.

(56) References Cited

U.S. PATENT DOCUMENTS 4,818,182 A    4/1989  Bouru et al.
5,073,084 A *  12/1991 Hirst ..................... F01D 11/001
                                                    415/134

(Continued)

FOREIGN PATENT DOCUMENTS

GB           630357        10/1949

OTHER PUBLICATIONS

International Appl. No. PCT/EP2023/068326, International Search Report, Translation of International Search Report, Written Opinion, and Translation of Written Opinion, dated Aug. 1, 2023, 16 pages.

*Primary Examiner* — Kayla Mccaffrey
(74) *Attorney, Agent, or Firm* — Kilpatrick Townsend & Stockton LLP (57) ABSTRACT

A protection element (45.1, 45.2) for a compressor drum (20) can be arranged at least in part between a blade root (25) and the compressor drum (20). The protection element can include:
  a first lateral wall (51.1, 51.2) including an inner portion (54.1, 54.2) intended to cover an inner rounded portion of a pocket (24), a bearing surface portion (55.1, 55.2) intended to cover a blade root bearing surface of the pocket (24), and an outer portion (56.1, 56.2) intended to cover an outer rounded portion of the compressor drum (20),
  a connecting wall (53.1, 53.2) intended to cover an outer face of the compressor drum (20), and
  a second lateral wall (52.1, 52.2) including a projecting portion (57.1, 57.2) intended to engage with a mounting groove (46.1, 46.2) formed in a vertical face of the compressor drum (20).

11 Claims, 8 Drawing Sheets

(56) References Cited

U.S. PATENT DOCUMENTS

| | | | |
|---|---|---|---|
| 6,332,617 B1 | 12/2001 | Leveaux et al. | |
| 8,251,667 B2 * | 8/2012 | Wilson | F01D 5/3038 |
| | | | 416/217 |
| 9,500,083 B2 * | 11/2016 | Cairo | B32B 5/26 |
| 9,631,495 B2 * | 4/2017 | Da Costa | F01D 5/3092 |
| 11,286,796 B2 * | 3/2022 | McCaffrey | F01D 5/3084 |
| 2009/0060745 A1 * | 3/2009 | Douguet | F01D 5/3007 |
| | | | 416/244 R |

* cited by examiner

PROTECTION ELEMENT FOR A COMPRESSOR DRUM AND METHOD FOR REPAIRING A COMPRESSOR DRUM

CROSS REFERENCE TO RELATED APPLICATIONS

This application is a U.S. national phase under 35 U.S.C. § 371 of International Patent Application No. PCT/EP2023/068326, filed on Jul. 4, 2023, which claims priority to France Patent Application No. 2208244, filed on Aug. 11, 2022, the entire contents of both of which are incorporated herein by reference in their entireties.

The present invention relates to a protection element for a low-pressure compressor drum of a turbomachine. The invention finds a particularly advantageous application for repairing a worn low-pressure compressor drum. However, the invention may also be implemented at the end of production with a low-pressure compressor drum in a new condition.

The operating principle of a turbomachine fan is to compress the air entering the engine. A large part of this air constitutes the secondary flow and the other part constitutes the primary flow. This primary flow passes through a low-pressure compressor integral with the fan, a high-pressure compressor, the combustion chamber, the high-pressure turbine and finally the low-pressure turbine before being ejected.

The compression by the fan is carried out in two phases. In a first phase, a moving blade assembly provides acceleration to the air particles, by deflecting them relative to the engine axis. The moving blade assembly comprises a plurality of blades mounted on a cylindrical hub called a "fan disk" driven in rotation by the low-pressure turbine.

In a second phase, a fixed fan assembly slows down the air particles and transforms part of their speed into pressure. This fixed fan assembly is called OGV (for "Outlet Guide Vane") or "rectifier" because it brings the air flow, accelerated by the moving fan assembly, back along the axis of the engine.

The same principle is applied by the low-pressure compressor downstream from the fan. The low-pressure compressor includes moving blades mounted on a cylindrical part called compressor drum as well as rectifiers consisting of fixed blades. Depending on the turbomachines, low-pressure compressors can have 3 to 5 stages, a compressor stage being composed of a wheel with moving blades and a grid of corresponding rectifiers.

Figure 1:
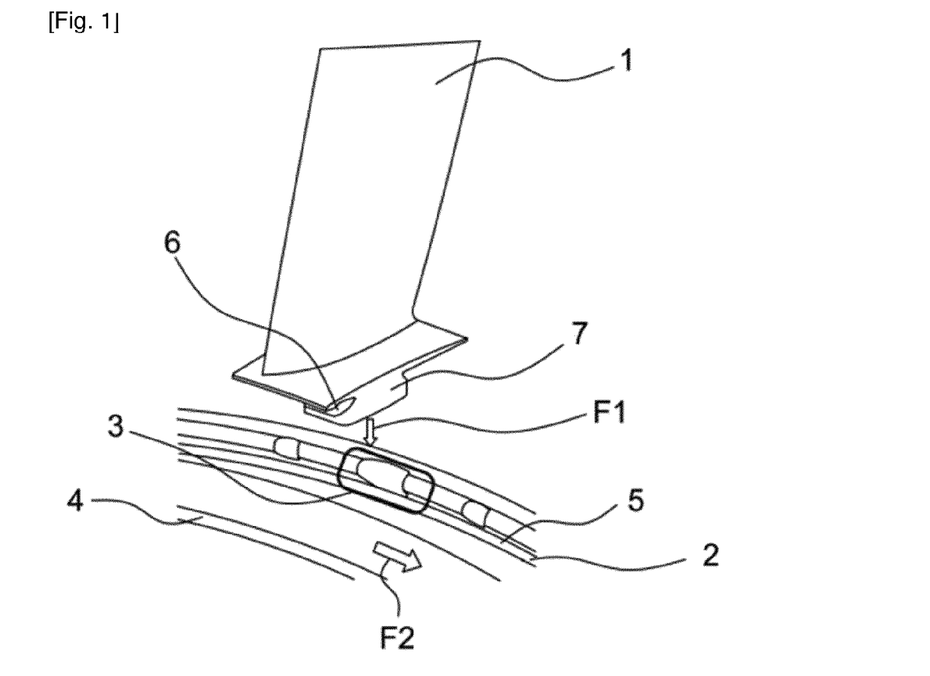
FIG. 1, already described, is a perspective view illustrating the mounting of the blades into a cell in the low-pressure compressor drum.

As illustrated in FIG. 1, for each stage of the low-pressure compressor, the moving blades 1 are installed in a corresponding cell 2 in the compressor drum 4 through an introduction window 3 according to the following steps:
  i—a first blade 1 is inserted along the arrow F1 into the cell 2 through the introduction window 3.
  ii—once the blade 1 is inserted, it is shifted tangentially along the arrow F2 by sliding it into cell 2 in order to clear the introduction window 3. The first blade 1 is then installed.
  iii—the next blade can then be inserted and the operation is repeated until all the blades 1 are installed inside the cell 2.

Figure 2:
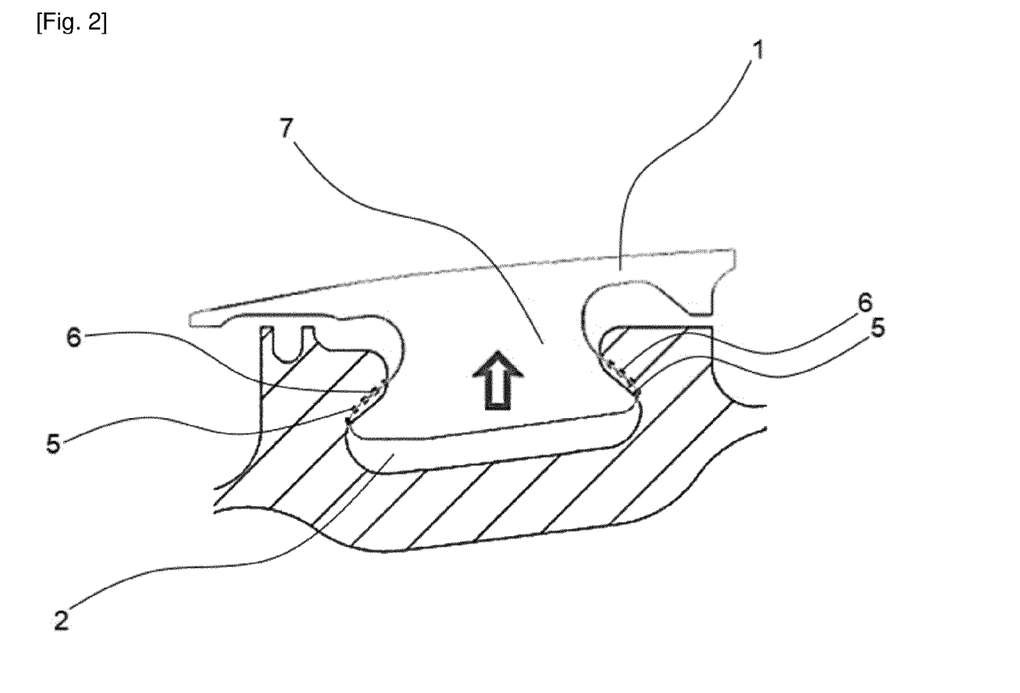
FIG. 2, already described, is a cross-sectional view of a compressor drum cell illustrating wear of the bearing areas by the blade root.

When the turbomachine and therefore the compressor drum 4 are rotated, the moving blades 1 are radially retained by the bearing areas 5 in the cell 2, as illustrated in FIG. 2. Such a mounting process for the moving blades 1 into a cell 2 in the compressor drum 4 is a conventional and proven installation of the state of the art.

Nevertheless, micro-displacements of the blades 1 inside the cell 2 at the location of a contact surface between the bearing areas 6 of the blade roots 7 and the bearing areas 5 in the cell 2 can locally wear said bearing areas 5 in the cell 2.

This wear represented by the broken lines in FIG. 2 is likely to reduce the radial clearances above the moving blades 1, which creates a risk of uncontrolled penetration of the moving blades 1 into the abradable gaskets. The wear also risks creating axial offsets of the moving blades 1 likely to interfere with the fixed blades. In addition, the position differences between the moving blades 1 impact the balancing of the compressor drum 4.

The mounting of moving blades 1 onto a worn compressor drum 4 may also be affected, since there is a risk that a moving blade 1 be located between an unworn part and a worn part of the bearing areas 5 of the compressor drum 4.

A significant wear may also affect the mechanical strength of the low-pressure compressor drum 4, which may break during operation.

The objective of the invention is to effectively remedy the aforementioned drawbacks by proposing a protection element for a compressor drum to be arranged at least partly between a blade root and the compressor drum comprising:
  a first side wall comprising an internal portion for covering an internal rounded portion of a cell in the compressor drum, a bearing area portion for covering a blade root bearing area in the cell, and an external portion for covering an external rounded portion of the compressor drum,
  a connecting wall for covering an external face of the compressor drum, and
  a second side wall comprising a projecting portion for cooperating with a mounting groove in a vertical face of the compressor drum.

The invention thus permits to restore the contact interface between the bearing areas in the drum cell and the moving blades. The invention therefore allows to install moving blades in the compressor drum in the same position as on a new drum at the end of production.

According to one embodiment of the invention, the connecting wall is elastically deformable so as to allow mounting of the protection element onto the compressor drum.

According to one embodiment of the invention, said protection element comprises a recess to be arranged opposite a portion of a blade introduction window in the compressor drum.

According to one embodiment of the invention, said protection element comprises at least one recess to be arranged opposite a portion of a blade lock introduction window.

According to one embodiment of the invention, the connecting wall comprises at least one passage opening for a projecting portion of a passage zone for a gasket.

According to one embodiment of the invention, said protection element is constituted by a folded sheet metal having a thickness between 0.2 mm and 0.4 mm.

According to one embodiment of the invention, said protection element is made from a nickel-based metallic material.

According to one embodiment of the invention, the bearing area portion is covered with a layer of lubricating varnish.

According to one embodiment of the invention, tangential length of the protection element is greater than a tangential length of a blade platform and less than or equal to a tangential length of five blade platforms.

The invention also relates to a method for repairing a compressor drum comprising:
- a machining step for removing bearing area wear in the compressor drum so as to define a cell having upstream and downstream bearing areas with regular surfaces,
- a machining step for two mounting grooves respectively upstream and downstream from the cell, and
- an installing step for an upstream protection element and a downstream protection element in such a way that the protection elements cooperate respectively with a corresponding mounting groove in the compressor drum and cover the upstream and downstream bearing areas in the cell.

According to one implementation of the invention, said method further comprises a machining step for a passage zone for a gasket so as to have an alternation of projecting portions and flat portions in order to facilitate installation of a protection element on the compressor drum.

According to one implementation of the invention, each protection element is installed by applying a radial force to the protection element, such that a connecting wall of the protection element is deformed so as to allow a projecting portion of each protection element to cooperate with a corresponding mounting groove before returning to its initial flat shape so as to cover a corresponding external face of the compressor drum.

According to one implementation of the invention, said method further comprises a machining step for external faces of the compressor drum respectively upstream and downstream from the cell.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein.

It should be noted that, in FIGS. 3 to 12, the structural and/or functional elements common to the different embodiments have the same references. Thus, unless otherwise stated, such elements have identical structural, dimensional and material properties.

In the remainder of the description, the terms "internal" and "external" are understood with reference to a radial direction relative to the axis X1 of the compressor drum, that is to say that an "internal" face is a radially internal face while an "external" face is a radially external face, such that the internal face is closer to the axis X1 of the drum than the external face.

Figure 3:
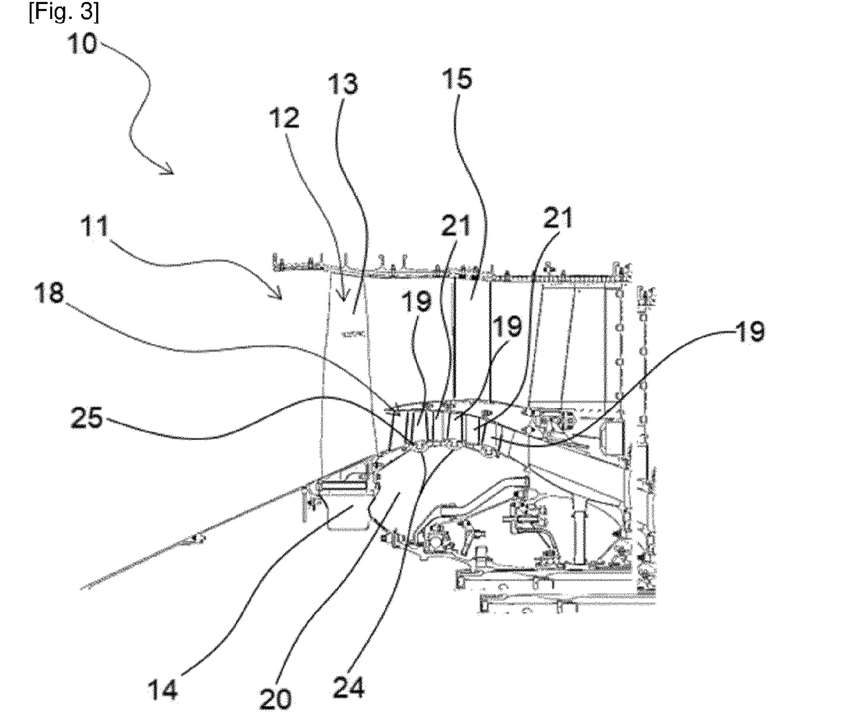
FIG. 3 is a longitudinal sectional view of a front part of a turbomachine.

FIG. 3 shows the front part of a turbomachine 10 comprising a fan 11 provided with a movable blade assembly 12 for accelerating the air particles, by deflecting them relative to the axis of the engine. The movable blade assembly 12 comprises a plurality of blades 13 mounted on a cylindrical hub 14 called a "fan disk" driven in rotation by the low-pressure turbine.

A fixed blade assembly 15 located downstream from the movable blade assembly 12 slows down the air particles and transforms part of their speed into pressure. This fixed blade assembly 15 is called OGV (for "Outlet Guide vane") or "rectifier" because it brings the flow of air, accelerated by the movable blade assembly 12, back along the axis of the engine.

A low-pressure compressor 18 includes moving blades 19 mounted on a cylindrical part called a low-pressure compressor drum 20 as well as rectifiers 21 consisting of fixed blades. Depending on the configuration of the turbomachine 10, the low-pressure compressor 18 may include 3 to 5 stages, a compressor stage being composed of a wheel with moving blades 19 and a grid of corresponding rectifiers 21.

Figure 4:
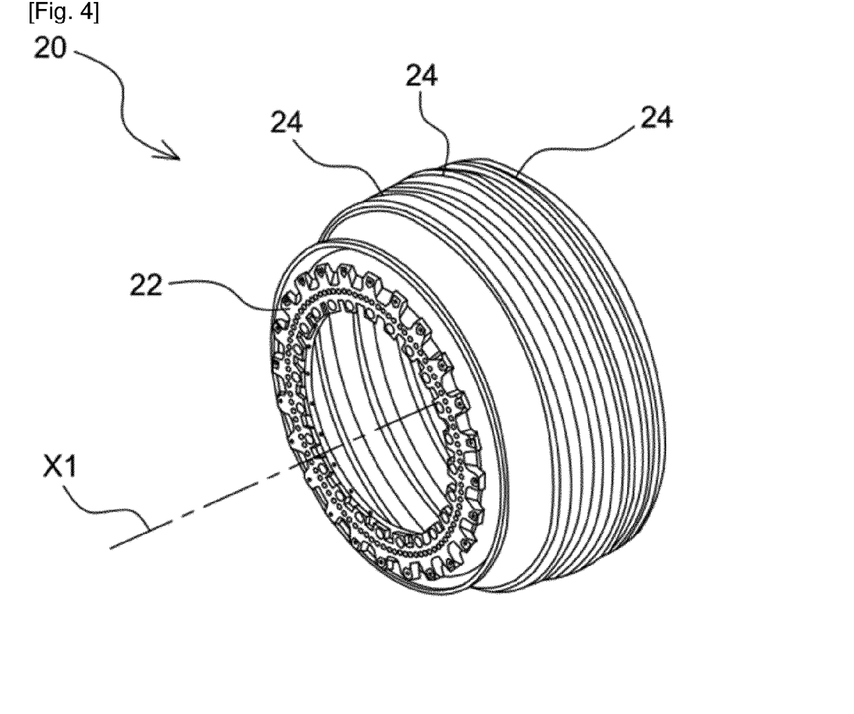
FIG. 4 is a perspective view of a low-pressure compressor drum on which the repair method according to the invention is implemented.

The compressor drum 20 of axis X1 shown in FIG. 4 has a cylindrical shape. The compressor drum 20 includes a plurality of cells 24 corresponding to the number of stages of the low-pressure compressor 18. Each cell 24 is a circumferential groove extending along a circumference of the drum 20 and receiving blade roots 25, such that the blades 19 are angularly and regularly spaced along a circumference of the compressor drum 20. The compressor drum 20 includes a fixing interface 22 with the hub 14 of the fan.

Figure 5:
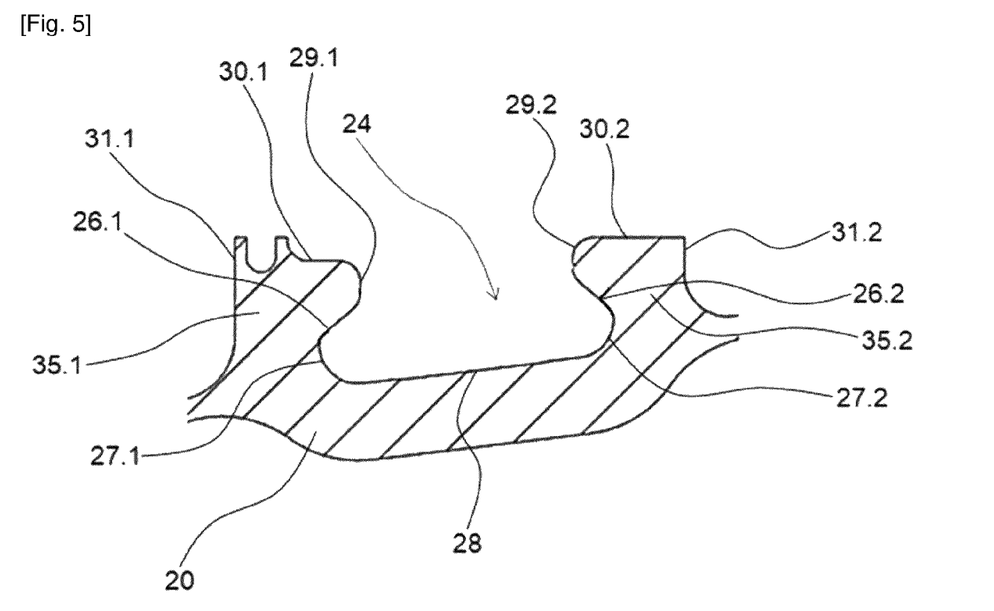
FIG. 5 is a cross-sectional view of a cell in the low-pressure compressor drum on which the repair method according to the invention is implemented.

As can be seen in FIG. 5, a cell 24 is delimited by an upstream blade root bearing area 26.1 against which a blade root bearing area 25 of corresponding shape abuts, an upstream internal rounded portion 27.1, a cell bottom 28, a downstream internal rounded portion 27.2 and a downstream blade root bearing area 26.2 against which a downstream blade root bearing area 26.2 of corresponding shape abuts. In a cross-sectional view, the upstream 26.1 and downstream 26.2 blade root surfaces form a non-zero angle relative to the cell bottom 28, such that the cell 24 generally has a trapezoidal shape complementary to that of a blade root 25. This permits to radially retain the blades 19 when the compressor drum 20 is rotating.

An upstream external rounded portion 29.1 and a downstream external rounded portion 29.2 are respectively located in an extension of the upstream 26.1 and downstream 26.2 blade root bearing areas in the corresponding cell 24.

The compressor drum 20 also includes an upstream external face 30.1 and a downstream external face 30.2. The external faces 30.1, 30.2 have an annular shape with an axial orientation relative to the axis X1. The external faces 30.1, 30.2 are radially located outwardly from the compressor drum 20 relative to the axis X1.

An upstream vertical face 31.1 and a downstream vertical face 31.2 each extend in a radial plane relative to the axis X1 of the compressor drum 20. Each (upstream 31.1 respectively downstream 31.2) vertical face is located on the side opposite the corresponding face including the (upstream 29.1 respectively downstream 29.2) external rounded portion, the (upstream 26.1 respectively downstream 26.2) blade root bearing area, and the (upstream 27.1 respectively downstream 27.2) internal rounded portion.

The upstream vertical face 31.1, the upstream external face 30.1, the upstream external rounded portion 29.1, the upstream blade root bearing area 26.1, and the upstream internal rounded portion 27.1 are made in an upstream wall 35.1 of the cell 24. The downstream vertical face 31.2, the downstream external face 30.2, the downstream external rounded portion 29.2, the downstream blade root bearing area 26.2, and the downstream internal rounded portion 27.2 are made in a downstream wall 35.2 of the cell 24.

Figure 6A:
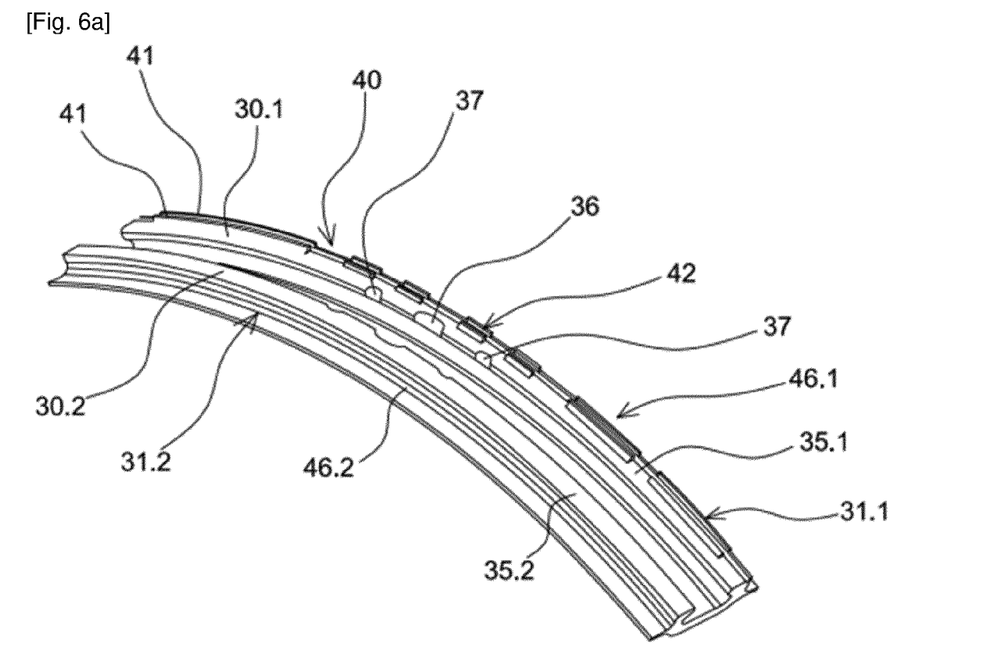
FIG. 6a is a partial perspective view of a cell in the compressor drum after a machining step for the repair method according to the invention.
Figure 6B:
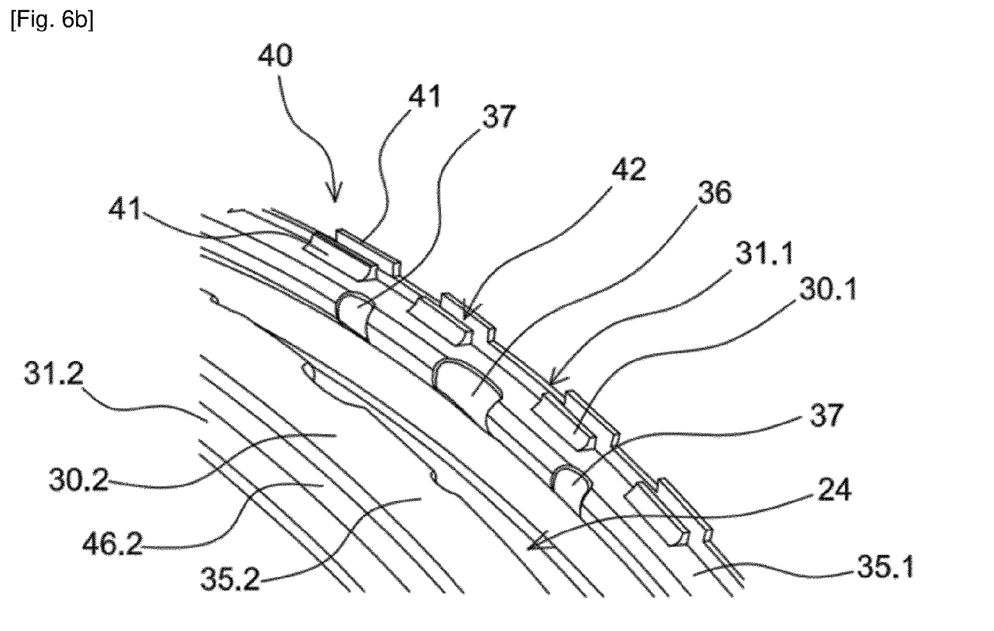
FIG. 6b is a detailed perspective view of the cell in FIG. 6a showing the machining process for a groove for receiving a gasket.

As can be seen in FIGS. 6a and 6b, the compressor drum 20 further comprises an introduction window 36 for the blade root 25 as well as two introduction windows 37 for blade locks on either side of the introduction window 36 for the blade root 25.

Furthermore, a passage zone 40 for a gasket is defined by two circumferential low walls 41 from the external face 30.1 between which extends a groove 42 for receiving the gasket (not shown). In the example shown, the gasket is intended to be arranged upstream from the cell 24. However, depending on the stage of the low-pressure compressor 18, the gasket may be installed upstream or downstream from the cell 24.

A method of repairing a worn low-pressure compressor 20 drum is described below.

A step of machining the drum 20 is carried out so as to eliminate wear on the bearing areas 26.1, 26.2 of the compressor drum 20 in order to define a cell 24 having upstream 26.1 and downstream 26.2 bearing areas with regular surfaces. The machining process is preferably carried out so that the cell 24 has an axisymmetric configuration, excluding the blade or lock introduction windows 36, 34.

A step of machining the compressor drum 20 is also carried out in order to allow the installation of the protection elements 45.1, 45.2 described in more detail below. According to this operation, two mounting grooves 46.1, 46.2 are made respectively upstream and downstream from the cell 24 in the upstream vertical face 31.1 and the downstream vertical face 31.2.

A step of machining the upstream 30.1 and downstream 30.2 external faces of the low-pressure compressor drum 20 is further carried out so as to obtain regular surfaces. In particular, the passage zone 40 for the gasket is machined so as to form an alternation of projecting portions 48 and flat portions 49 in order to facilitate installation of a protection element 45.1, 45.2 on the low-pressure compressor drum 20.

Once the machining steps are completed, an upstream protection element 45.1 and a downstream protection element 45.2 are installed such that the protection elements 45.1, 45.2 respectively cooperate with a corresponding mounting groove 46.1, 46.2 in the drum 20 and respectively cover the upstream bearing area 26.1 and the downstream bearing area 26.2 in the cell 24.

Figure 12:
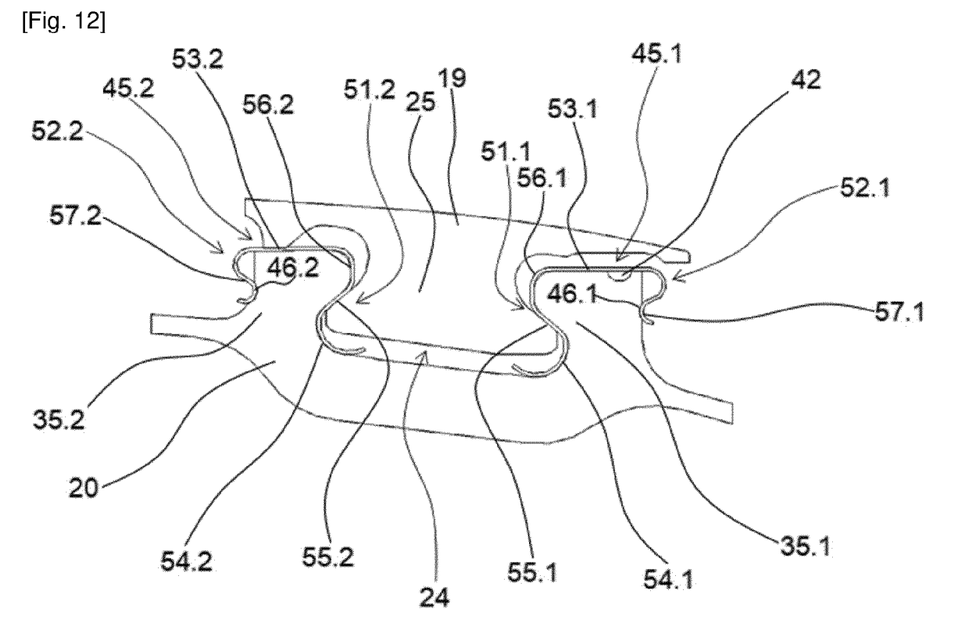
FIG. 12 is a perspective view illustrating the positioning of the upstream and downstream protection elements according to the invention between the bearing areas of a blade and the bearing areas of a cell in a low-pressure compressor drum.

The protection elements 45.1, 45.2 thus fill the clearance between the bearing areas of the moving blade 19 and the bearing areas in the cell 24 in the compressor drum 20, as shown in FIG. 12.

More specifically, each protection element 45.1, 45.2 (upstream or downstream) is intended to be arranged at least partly between a blade root 25 and the compressor drum 20.

Figure 7A:
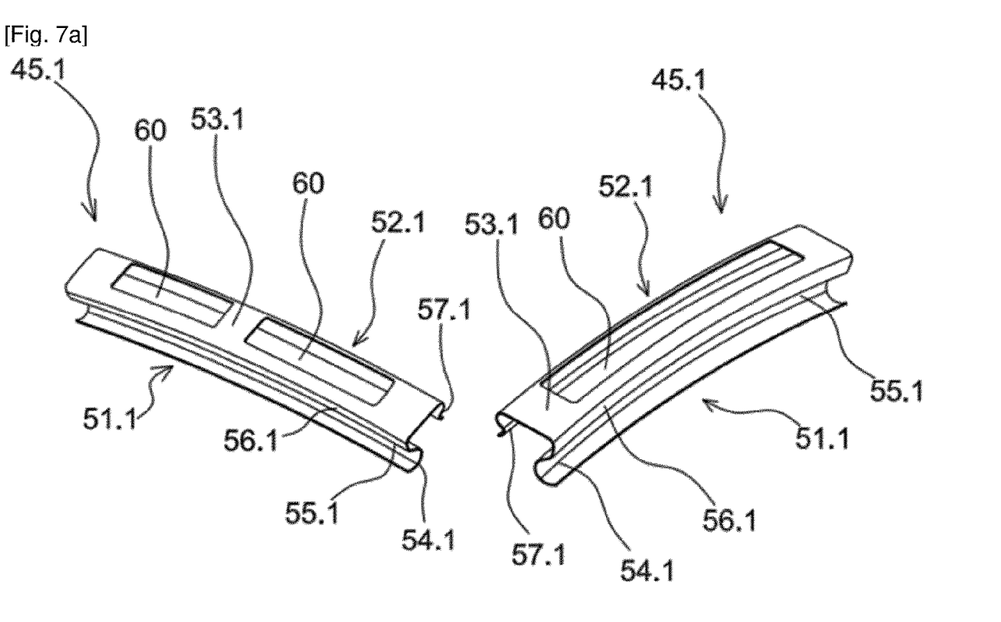
FIG. 7a is a perspective view of an upstream protection element for a compressor drum according to the invention having a standard configuration.

According to a standard upstream geometry shown in FIGS. 7a and 12, the upstream protection element 45.1 also called "upstream foil" comprises a first upstream side wall 51.1, a second upstream side wall 52.1 and an upstream connecting wall 53.1 providing the connection between the first upstream side wall 51.1 and the second upstream side wall 52.1.

The first upstream side wall 51.1 comprises an upstream internal portion 54.1 for covering the upstream internal rounded portion 27.1 of a cell 24, an upstream bearing area portion 55.1 for covering an upstream blade root bearing area 26.1 in the cell 24 and an upstream external portion 56.1 for covering an upstream external rounded portion 29.1 of the drum in an extension of the upstream blade root bearing area 26.1. The upstream bearing area portion 55.1 forms a non-zero angle with respect to the upstream connecting wall 53.1.

The objective of the upstream connecting wall 53.1 is to cover the upstream external face 30.1 of the compressor drum 20. The upstream connecting wall 53.1 has a flat shape. The upstream connecting wall 53.1 is elastically deformable so as to allow mounting of the upstream protection element 45.1 onto the compressor drum 20. The upstream connecting wall 53 comprises at least one passage opening 60 for a projecting portion 48 of the gasket passage zone 40. The number of passage openings depends on the configuration of the gasket passage zone 40 where the upstream protection element 45.1 is positioned.

The second upstream side wall 52.1 comprises an upstream projecting portion 57.1 for cooperating with the upstream mounting groove 46.1 in an upstream vertical face 31.1 of the drum. The upstream projecting portion 57.1 extends towards the inside of the upstream protection element 45.1. The second upstream side wall 52.1 has an S-shaped configuration. The upstream protection element 45.1 has an axisymmetric geometry at the cell 24.

Figure 7B:
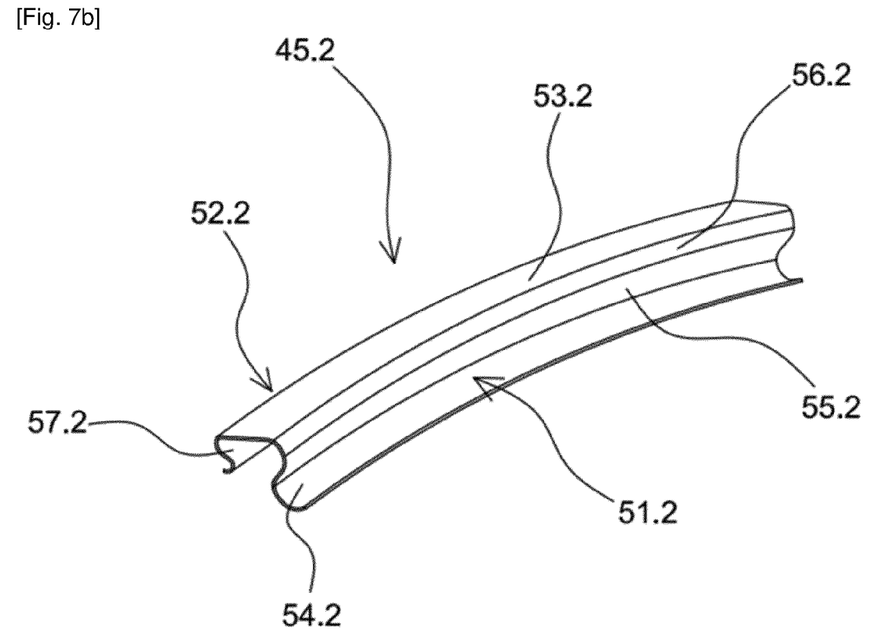
FIG. 7b is a perspective view of a downstream protection element for a compressor drum according to the invention having a standard configuration.

Similarly, according to a standard downstream geometry shown in FIGS. 7b and 12, the downstream protection element 45.2 comprises a first downstream side wall 51.2, a second downstream side wall 52.2 and a downstream connecting wall 53.2 for connecting the first downstream side wall 51.2 and the second downstream side wall 52.2 to one another.

The first downstream side wall 51.2 comprises an internal downstream portion 54.2 for covering the internal rounded downstream portion 27.2 of a cell 24, a downstream bearing area portion 55.2 or covering a downstream blade root bearing area 26.2 of a cell 24 and a downstream external portion 56.2 for covering the downstream external rounded portion 29.2 of the drum 20 in an extension of the downstream blade root bearing area 26.2. The downstream bearing area portion 55.2 forms a non-zero angle relative to the downstream connecting wall 53.2.

The downstream connecting wall 53.2 is aimed to cover the downstream external face 30.2 of the compressor drum 20. The downstream connecting wall 53.2 has a flat shape. The downstream connecting wall 53.2 is elastically deformable for mounting the downstream protection element 45.2 onto the compressor drum 20.

The second downstream side wall 52.2 comprises a downstream projecting portion 57.2 for cooperating with the downstream mounting groove 46.2 in the downstream vertical face 31.2 of the drum 20. The downstream projecting portion 57.2 extends towards the inside of the downstream protection element 45.2. The second downstream side wall 52.2 has an S-shaped configuration. The downstream protection element 45.2 has an axisymmetric geometry at the cell 24.

Figure 8A:
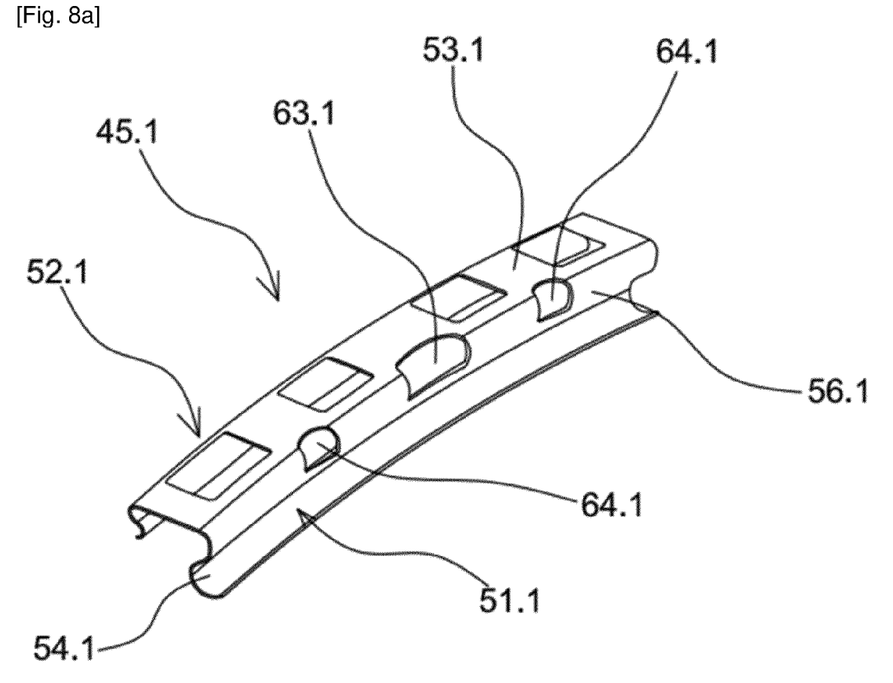
FIG. 8a is a perspective view of an upstream protection element for a compressor drum according to the invention having a "lock" type configuration.

According to a lock-type geometry shown in FIG. 8a, the upstream protection element 45.1 comprises an upstream recess 63.1 to be arranged opposite an upstream portion of a blade introduction window 36 in the low-pressure compressor drum 20. The upstream recess 63.1 is made in the upstream external portion 56.1 and the upstream connecting wall 53.1 of the upstream protection element 45.1. upstream The protection element 45.1 also comprises recesses 64.1 each to be arranged opposite a portion of a blade lock introduction window 37.

Figure 8B:
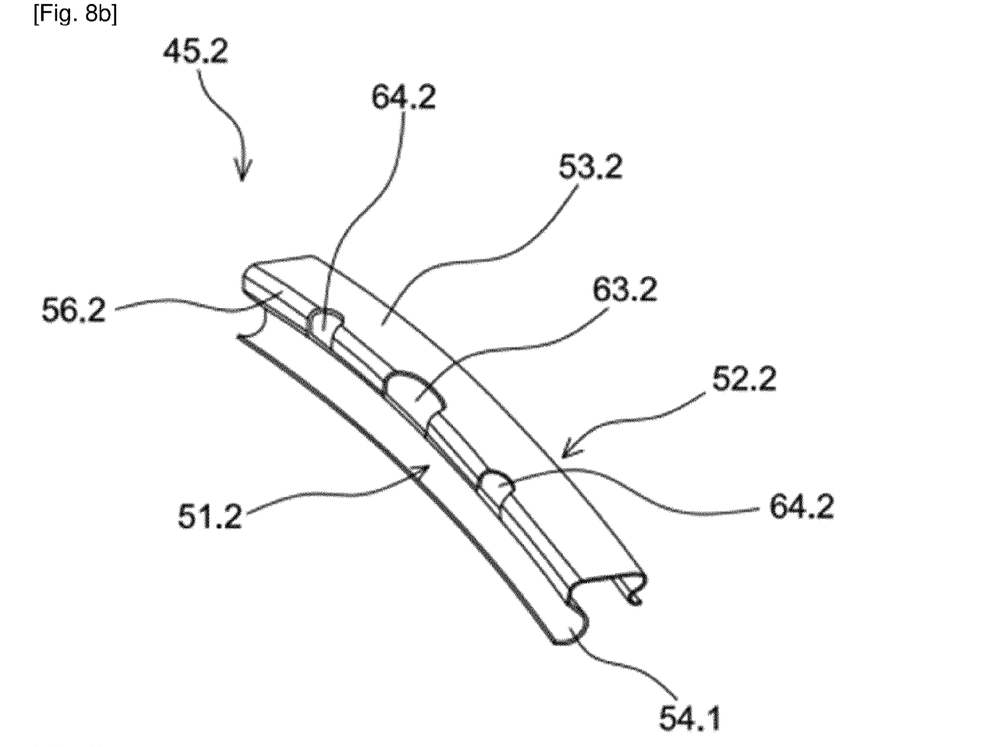
FIG. 8b is a perspective view of a downstream protection element for a compressor drum according to the invention having a "lock" type configuration.

Similarly, according to a lock-type geometry shown in FIG. 8b, the downstream protection element 45.2 comprises a downstream recess 63.2 to be arranged opposite a downstream portion of a blade introduction window 36 in the compressor drum 20. The downstream recess 63.2 is made in the downstream external portion 56.2 and the downstream connecting wall 53.2 of the downstream protection element 45.2. The downstream protection element 45.2 also comprises recesses 64.2 to be arranged opposite a portion of a blade lock introduction window 37.

Preferably, each protection element 45.1, 45.2 is constituted by a folded sheet metal having a thickness between 0.2 mm and 0.4 mm. The thickness of the sheet metal may be adapted to the repair requirement so as to compensate for the level of wear of the cell 24. The thin sheet metal is sufficiently deformable so as to allow the protection element 45.1, 45.2 to match the shape of the machined cell 24.

Each protection element 45.1, 45.2 is made from a nickel-based metallic material, in particular of the inconel type (registered trademark). Such a material provides superior wear resistance to titanium and permits to produce parts of low thicknesses that are sufficiently rigid to withstand the matting stresses at the interface between the moving blades 19 and the compressor drum 20.

The bearing area portion 55.1, 55.2 may be covered with a layer of lubricating varnish. This permits to improve the contact conditions between a moving blade 19 and the corresponding bearing 26.1, 26.2 of the cell 24 in order to maximize the service life of the compressor drum 20.

Preferably, a tangential dimension of the protection element 45.1, 45.2 is such that several, in particular 1 to 5, moving blades 19 can be in contact with the latter. Advantageously, a tangential length of the protection element 45.1, 45.2 is greater than a tangential length of a blade platform 65 (see FIG. 11) in order to prevent the bearing areas of a blade 19 from being in contact with two neighboring protection elements 45.1, 45.2, thereby generating a contact discontinuity between the moving blade 19 and the compressor drum 20.

Furthermore, the tangential length of the protection element 45.1, 45.2 is less than or equal to a tangential length of five blade platforms 65 in order to allow deformation of the protection element 45.1, 45.2 for its mounting onto the compressor drum 20. Indeed, a greater length of the protection element 45.1, 45.2 would increase its rigidity, which would prevent it from being deformed, which is necessary for its mounting onto the compressor drum 20.

Figure 9:
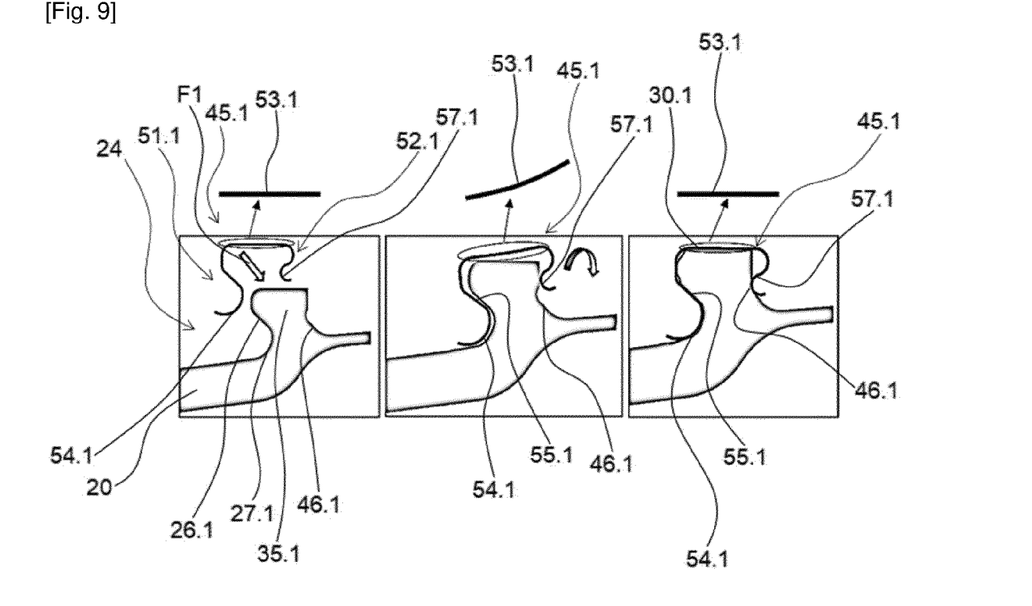
FIG. 9 shows the different steps of installing a protection element according to the invention into a cell in a low-pressure compressor drum.

The various steps of mounting the protection element 45.1 are described below, with reference to FIG. 9. The steps are identical with those for the protection element 45.2 except for the mounting direction.

As illustrated by the left-hand view, the protection element 45.1 is positioned according to the arrow F1, such that the internal portion 54.1 and the bearing area portion 55.1 come respectively opposite the internal rounded portion 27.1 and the bearing area 26.1 of a cell 24. The connecting wall 53.1 has a flat shape before its mounting.

As illustrated by the central view, a radial force is applied to the protection element 45.1, such that the connecting wall 53.1 is deformed in order to allow the projecting portion 57.1 of the protection element 45.1 to cooperate with the mounting groove 46.1.

As illustrated by the right-hand view, the connecting wall 53.1 then resumes its initial flat shape so as to cover the external face 30.1 of the compressor drum 20. Thus, the upstream 45.1 or downstream 45.2 protection element is held respectively around an upstream 35.1 or downstream 35.2 wall of a cell 24.

Figure 10:
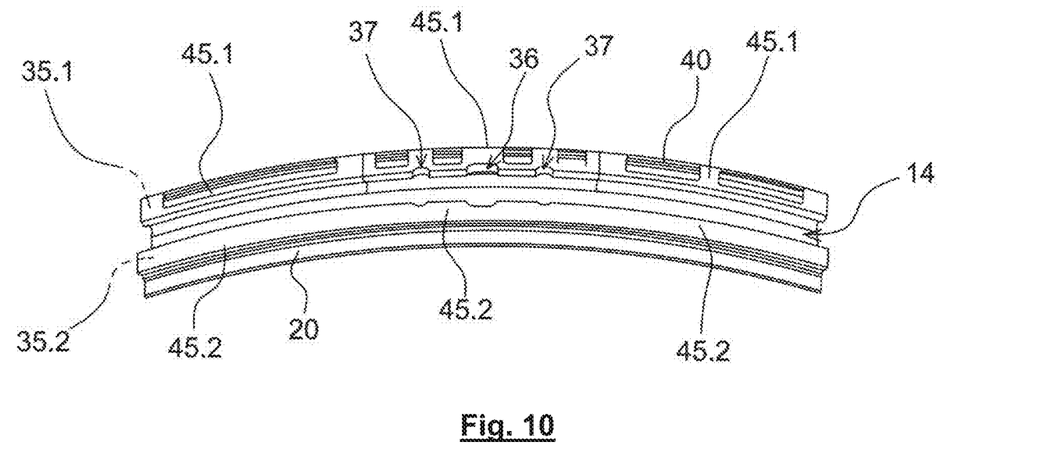
FIG. 10 is a perspective view of a cell in a low-pressure compressor drum in which protection elements according to the invention have been installed.

As illustrated in FIG. 10, a plurality of upstream protection elements 45.1 are thus arranged edge to edge in order to follow the circumference of an upstream wall 35.1 of the cell 24 in the drum. Similarly, a plurality of downstream protection elements 45.2 are arranged edge to edge in order to follow the circumference of a downstream wall 35.2 of the cell 24 in the drum. The geometry of the protection element 45.1, 45.2 (standard or lock) is adapted according to the configuration of the cell 24 in the implantation area for the protection element 45.1, 45.2.

Figure 11:
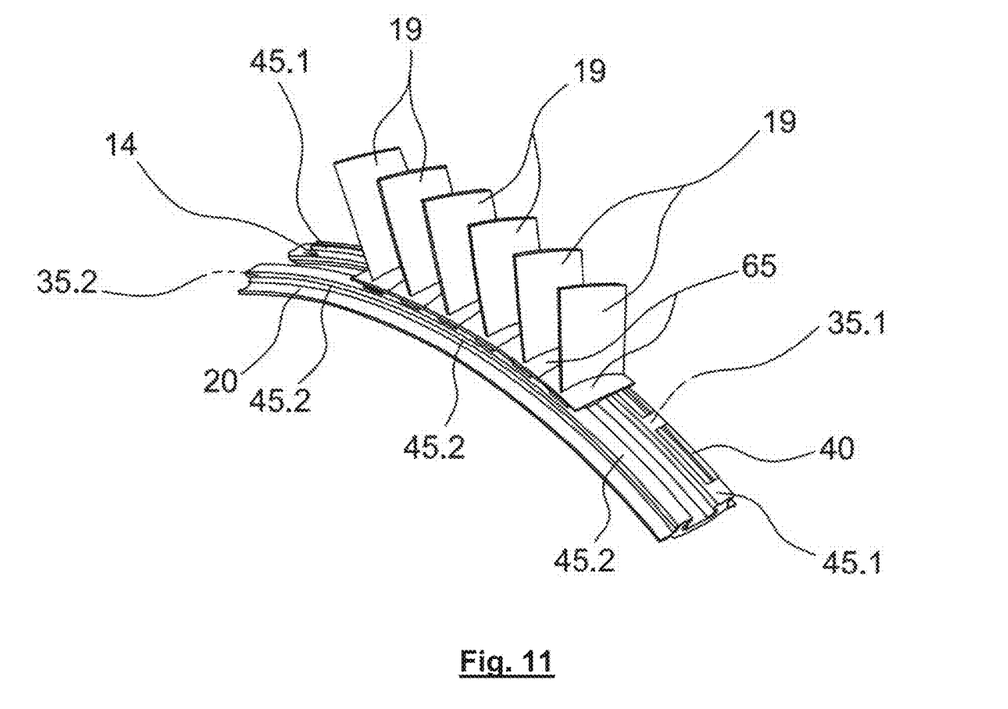
FIG. 11 is a perspective view illustrating the installation of blades into a cell in a low-pressure compressor drum in which protection elements according to the invention have been installed.

As shown in FIG. 11, the blades 19 can then be installed inside the cell 24 through the introduction window 36 according to the method previously described with reference to FIG. 1. Blade locks are then implemented through the windows 37 in order to prevent the blades 19 from moving inside the cell 24.

The invention also relates to the assembly formed by a protection element 45.1, 45.2 and the compressor drum 20.

Of course, the different characteristics, variants and/or embodiments of the present invention can be associated with each other in various combinations insofar as they are not incompatible with or exclusive of one another.

Furthermore, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:
1. An assembly comprising:
a blade comprising a blade root,
a compressor drum having an axis and a cylindrical shape,
the compressor drum including at least one cell, the cell being a circumferential groove extending along a circumference of the compressor drum, the cell being delimited by an upstream blade root bearing area against which a blade root bearing area of corresponding shape abuts, an upstream internal rounded portion, a cell bottom, a downstream internal rounded portion and a downstream blade root bearing area against which a downstream blade root bearing area of corresponding shape abuts, an upstream external rounded portion and a downstream external rounded portion being respectively located in an extension of the upstream blade root bearing area and the downstream blade root bearing area, the compressor drum also including an upstream external face and a downstream external face having an annular shape with an axial orientation relative to the axis, an upstream vertical and a downstream vertical face extending each in a radial plane relative to the axis of the compressor drum, at least one mounting groove made in one face chosen among the upstream vertical face or the downstream vertical face, a protection element for the compressor drum to be arranged at least partly between the blade root and the compressor drum, the protection element comprising:
- a first side wall comprising an internal portion covering one of the internal rounded portions in the cell, a bearing area portion covering one of the blade root bearing areas in the cell, and an external portion for covering one of the external rounded portions of the compressor drum;
- a connecting wall covering one of the external faces of the compressor drum; and
- a second side wall comprising a projecting portion cooperating with the mounting groove made in the vertical face of the compressor drum.

2. The assembly according to claim 1, wherein the connecting wall is elastically deformable so as to allow the protection element to be mounted onto the compressor drum.

3. The assembly according to claim 1, wherein the protection element further comprises a recess to be arranged opposite a portion of a blade introduction window in the compressor drum.

4. The assembly according to claim 1, wherein the protection element further comprises at least one recess to be arranged opposite a portion of a blade lock introduction window.

5. The assembly according to claim 1, wherein the connecting wall comprises at least one passage opening for a projecting portion of a passage zone for a gasket.

6. The assembly according to claim 1, wherein the protection element is constituted by a folded sheet metal having a thickness between 0.2 mm and 0.4 mm.

7. The assembly according to claim 1, wherein the protection element is made from a nickel-based metallic material.

8. The assembly according to claim 1, wherein at least one side of the bearing area portion is covered with a layer of lubricating varnish.

9. The assembly according to claim 1, wherein a tangential length of the protection element is greater than a tangential length of a blade platform and less than or equal to a tangential length of five blade platforms.

10. A protection element for a compressor drum to be arranged at least partly between a blade root and the compressor drum, the protection element comprising:
- a first side wall comprising an internal portion for covering an internal rounded portion in a cell in the compressor drum, a bearing area portion for covering a blade root bearing area in the cell, and an external portion for covering an external rounded portion of the compressor drum;
- a connecting wall for covering an external face of the compressor drum;
- a second side wall comprising a projecting portion for cooperating with a mounting groove in a vertical face of the compressor drum; and
- a recess to be arranged opposite a portion of a blade introduction window in the compressor drum.

11. A protection element for a compressor drum to be arranged at least partly between a blade root and the compressor drum, the protection element comprising:
- a first side wall comprising an internal portion for covering an internal rounded portion in a cell in the compressor drum, a bearing area portion for covering a blade root bearing area in the cell, and an external portion for covering an external rounded portion of the compressor drum;
- a connecting wall for covering an external face of the compressor drum;
- a second side wall comprising a projecting portion for cooperating with a mounting groove in a vertical face of the compressor drum; and
- at least one recess to be arranged opposite a portion of a blade lock introduction window.

* * * * *